US005241876A

United States Patent [19]

Mathis

[11] Patent Number: 5,241,876

[45] Date of Patent: Sep. 7, 1993

[54] DEVICE FOR OPERATING A WHEELCHAIR WITH ONE ARM

[75] Inventor: Tim Mathis, Joplin, Mo.

[73] Assignee: Houser Carter, Inc., Joplin, Mo.

[21] Appl. No.: 808,677

[22] Filed: Dec. 17, 1991

[51] Int. Cl.[5] .................... B60N 3/00; G05G 11/00

[52] U.S. Cl. .................... 74/481; 280/250.1; 280/304.1; 135/66

[58] Field of Search ............ 74/481; 280/250.1, 304.1; 135/66, 74

[56] References Cited

U.S. PATENT DOCUMENTS 3,759,544 9/1973 Korpela .................... 280/304.1
4,483,548 11/1984 Zirrilo .................... 280/304.1
4,625,742 12/1986 Phillips .................... 135/66
4,811,964 3/1989 Horn .................... 280/250.1
4,865,344 9/1989 Romero, Sr. et al. ....... 280/304.1 X
5,112,072 5/1992 Korosue .................... 280/250.1 X

FOREIGN PATENT DOCUMENTS 0004761 10/1979 European Pat. Off. .............. 135/75
2178375 2/1987 United Kingdom ............. 280/250.1

*Primary Examiner*—Rodney H. Bonck
*Assistant Examiner*—Andrea Pitts
*Attorney, Agent, or Firm*—Walter M. Benjamin

[57] ABSTRACT

Disclosed is a device for operating a wheelchair with an occupant's use of one arm comprising a first member having structure to be engagably attached to the frame of the wheelchair and a second member movably attached to the first member such that when the device is attached to a wheelchair, the second member is cabable of frictionally engaging the surface across which the wheelchair is operated by frictionally engaging said surface in the periphery of the front of the wheelchair. The further embodiment of the device comprises an urging device which urges the second member away from engagment with the surface across which the wheelchair is operated.

18 Claims, 2 Drawing Sheets

DEVICE FOR OPERATING A WHEELCHAIR WITH ONE ARM

BACKGROUND OF THE INVENTION

A. Field of the Invention

The applicant's invention relates to a device which allows an occupant of a wheelchair to operate the wheelchair by propelling himself with one arm, more particularly it relates to a device which can be attached to any wheelchair and which allows the occupant of the wheelchair to operate the wheelchair by propelling himself with one arm and even more particularly it relates to a device which can be attached to any wheelchair and which allows an occupant of the wheelchair to operate the wheelchair by propelling himself with one arm by frictional engagement of the device with the surface in the front periphery of the wheelchair.

B. Description of the Prior Art

Conventional wheelchairs are operated manually by a ring attached to the rim of large wheels. This type of wheelchair, however, cannot be operated by someone who has limited use of one arm, such as someone who is paralyzed in one of their upper extremities. Unconventional wheelchairs designed for operation with one arm have been introduced. One such wheelchair comprises double rings on one side of the wheelchair whereby one ring operates the wheel on one side of the wheelchair and the other ring operate the wheel on the other side of the wheelchair, however with this chair, it is extremely difficult to maneuver sharp turns around items normally found in areas of their use. Another such wheelchair comprises a lever linked with a differential mechanism which through an expansion joint operates forward/backward clutches driven to interlock with the differential mechanism. This device is awkward to operate, limited in its use, expensive to manufacture and difficult to install. Even other wheelchairs have been introduced, but they are complicated, expensive, difficult to install and difficult or impossible to be operated with one arm.

Heretofore there has not been a device available that could be adapted to a powered wheelchair during the time it is disabled whereby the occupant can continue mobility. Such a device is especially needed for this application because occupants of powered wheelchairs are usually more disabled. It is therefore desired that there be a device which is simple, easy to use, inexpensive, adaptable to most wheelchairs and especially usable with one arm.

Examples of wheelchairs introduced in the art includes the following:

U.S. Pat. No. 4,506,900 to Koroosue discloses a "Lever-Operated Type of wheelchair" which utilizes the forward/backward clutches as described above.

U.S. Pat. No. 3,994,509, to Schaeffer discloses a "Propulsion Means for Wheelchairs" which comprises two drive assemblies mounted one on each side of a wheelchair, which means includes a lever pivotally mounted on and engaged with the axle of the wheelchair.

U.S. Pat. No. 4,538,826, to Lemarie disloses an "Aid for Propelling Wheeled Vehicles" by use of a pair of arms which operates caliper assemblies which engages and rotates the wheels through the operation of the arms.

U.S. Pat. No. 4,354,691, to Saunders et. al. discloses a "Wheel Chair Propulsion System" which utilizes an annular ring smaller than the diameter of the large wheel, which annular ring is engaged by a lever pivotally mounted on the axle of the large wheel.

U.S. Pat. No. 4,126,329, to Tehernyak discloses a "Wheeled Vehicle With Oar-Type propulsion" which utilizes levers which operates a drive mechanism including first and second drive wheels rotated by an oar-type motion of the levers.

U.S. Pat. No. 4,692,784, to Anderson discloses a "Wheelchair With Variable Ratio Propulsion" utilizing concentric ratchet rings operated by levers on the side of the wheelchair engagable with the ratchet rings.

U.S. Pat. No. 4,560,181, to Herron discloses a "Wheelchair Operated by Hand Pedalled Reciprocating Motion" which is powered by reciprocating operation of a drive lever which operates a drive mechanism having continuously variable gear ratios.

U.S. Pat. No. 4,762,332, to Seol discloses a "Wheel Chair" having a propulsion and speed change mechanism utilizing a clutch and a cam clutch.

U.S. Pat. No. 4,453,729, to Lucken discloses an "Occupant Propellable Wheelchair" utilizing reciprocating levers on each side of the wheelchair which drives the wheels by a rachet mechanism.

SUMMARY OF THE INVENTION

Applicant has discovered that he can duplicate the motion of one propelling himself in a wheelchair with the scooting motion of one foot by using a simple, easily installed and inexpensive device which is operated with one arm. Accordingly, applicant has discovered a device for operating a wheelchair with an occupant's use of one arm, comprising a first member having means to be engagably attached to the frame of the wheelchair and a second member movably attached to the first member such that when the device is attached to the wheelchair, the second member is capable of frictionally engaging the surface across which the wheelchair is propelled by engaging said surface around the periphery of the front of the wheelchair. As a means of facilitating ease in its use, a further embodiment of the device comprises an urging means which urges the second member away from engagment with the surface so that successive strokes of movement are less cumbersome.

BRIEF DESCRIPTION OF THE DRAWINGS

A better understanding of the invention will be had upon reference to the following description in conjunction with the accompanying drawings wherein.

DESCRIPTION OF THE PREFERRED EMBODIMENT

Figures 1, 2:
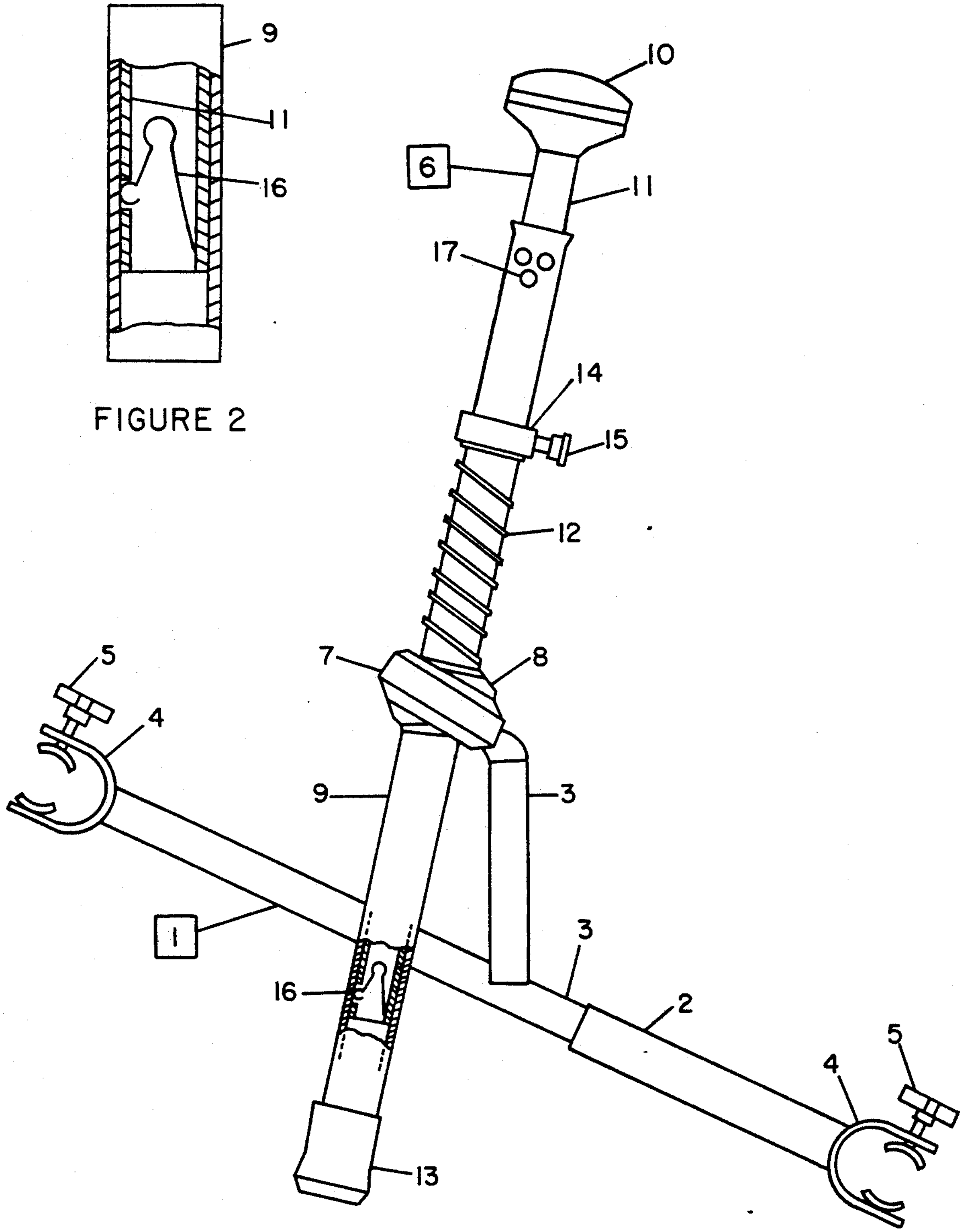
FIG. 1 shows an assembly view of applicant's device.
FIG. 2 shows an enlarged view of a portion of Applicant's device.

According to Applicant's invention a device for operating a wheelchair with an occupant's use of one arm is disclosed. It comprises a first member which has means to be engagedly attached to the frame of the wheelchair. Conventional wheelchairs comprises a lightweight tubular frame having thereon a seat, a backrest and a foot rest. On the front portion of the frame are substantially vertical and horizontal members of the frame of the wheelchair. The first member of applicant's invention is equipped with means to be engagedly attached to preferably said front portion of the frame of the wheelchair. While this first member can be permanently attached to the wheelchair, it is preferred that this first member can be easily attached and easily removed so that when a wheelchair is not in use, the applicant's device can be removed to allow the wheelchair to be folded and stored. Accordingly, the first member can be an elongated member having on each end a clamp which can engage the frame of the wheelchair. The elongated member can be a bar or tubing made out of suitable material like metal, wood or plastic or such like having a "C" or "U" clamp on each end. These clamps attaches to the frame by engaging the frame in the "C" or "U" and tightening the clamp on the frame with a set screw. Other similar devices are well known in the art.

The first member may further comprise a means to adjust the distance between the means for the engagedly attachment to the frame of the wheelchair. In this embodiment where the first member is a tube, adjustment in length may be obtained by having one tube slidebly telescoping out of another tube with a snug fit thereinbetween. This allows the first member to be attached to various sizes of wheelchair frames without being loose after length adjustment. Similar adjustments may be achieved with a first member having other configurations.

The second member is movably attached to the first member. By being movably attached to the first member, it is meant that the second member can be moved in any direction in relation to the first member except movement in a skew direction. Consequently, the first member can be rigidly attached to the frame of the wheelchair, while the second member can move in any motion rotating around the first member and any motion at any angle to the first member without being detached from the first member. Such attachment and movement can be partially achieved using a pivot between the first and second member. A common pivot attachment is a ball and socket joint, wherein a ball which is attached to the second member is fitted in a socket which is connected to the first member, which will allow partially the movement contemplated by this invention.

The remainder of the movement comtemplated by this invention includes an attachment which also includes an arrangement whereby the second member can move in a reciprocating motion relative to an angle to the axis of the first member. This can be attained by an arm and sleeve arrangement whereby the arm is attached to one member and the sleeve is attached to the other member and whereby one member is at an angle with the other member so that one member can slide relative to an angle to the axis of the other member by the arm moving within the sleeve. So, by having the pivot as well as the arm and sleeve attachment between the first and second member, the desired motion necessary for this invention can be attained between the first and second member.

The second member must be cabable of frictionally engaging the surface upon which the wheelchair is to be propelled, which surface engaged is around the periphery of the front of the wheelchair where the steering wheels are located. The surface includes the ground or the floor of a building or whatever surface upon which an occupant of the chair can go, except slippery surfaces which cannot be frictionally engaged. The means for frictionally engaging the surface could be an oval-shaped rubber tip on the end of the second member or it could be a pivot means having a flat rubber clad surface on one side. This pivot may comprise a ball and socket joint arrangement having a flat rubber-clad surface on one side.

Accordingly, the second member may be a staff made of wood, metal, plastic or the like, having one end telescoping out of the other end such that it may be collapsed to a fraction of its length so that it would not interfere with an occupant exiting the wheelchair. This telescoping arrangement could also satisfy the arm and sleeve motion described above. Further, the second member should have a means to lock a telescoped second member in place after lengthening so that it will be rigid enough to propel an occupant in the wheelchair. The locking means could be a spring-loaded button on the inner telecope which engages a hole in the outer telescope. The staff would have a handle or knob on one end for grasping with the hand and a oval-shaped rubber tip or a flat-sided, rubber cladded ball and socket joint on the other end for frictionally engaging the surface upon which the wheelchair is propelled.

A further embodiment of the device comprises an urging means which urges the second member away from engagment with the surface across which the wheelchair is propelled. The purpose of this urging means is to allow an occupant of a wheelchair to propel himself by frictionally engaging the surface directly in front of him and pulling himself forward and releasing the second member such that the urging means will lift the second member from the surface so that successive steps can be achieved with ease. Similar motions are utilized to maneuver sideways or backwards. The motion would be similar to a rowing motion except the upward motion is aided by the urging means. Such an urging means could be a spring mounted on the second member and engaging the first member thereby urging the second member in the direction away from the friction end.

Applicant's device may further comprise a third member which connects the first member to the second member. This third member is merely used to extend the second member away from the first member. Accordingly, the third member is rigidly attached to the first member and movably attached to the second member in such a way that the first and second members are in skewed relationship with each other as described above with regard to the first and second member. The said skewed distance between the first and second member is fixed by the length of the third member and as a consequence does not move relative to each other in regard to this skewed distance. Just as in the case of the first and second members, the third member may be constructed from wood, plastic, metal or the like tubing.

Reference is now made to the drawings in which FIG. 1 shows an assembly view of applicant's invention. First member 1 comprises a telescoping outer tube 2 and an inner tube 3 and having a "C" clamp 4 which is tightened by a set screw 5 on each end of first member 1. Third member 3 is rigidly attached to the telescoping inner tube 3 and attached to second member 6 by a socket 7 and a ball 8 slidably mounted on the telescoping outer tube 9. Knob 10 is mounted on the end of the telescoping inner tube 11 which is inserted in telescoping outer tube 9. Spring 12 is situated on the telescoping outer tube 9 between ball 8 and collar 14 which is secured by set screw 15. When tubes 9 and 11 are telescoped outwardly, spring loaded button 16 (see FIG. 2) engages in hole 17 to hold the tubes in the extended position. Rubber tip 13 is mounted on the end of telescoping outer tube 9. The knob 10, telescoping tubes 9 and 11, and tip 13 as an assembly has been referred to as the second member or a staff.

Figure 3:
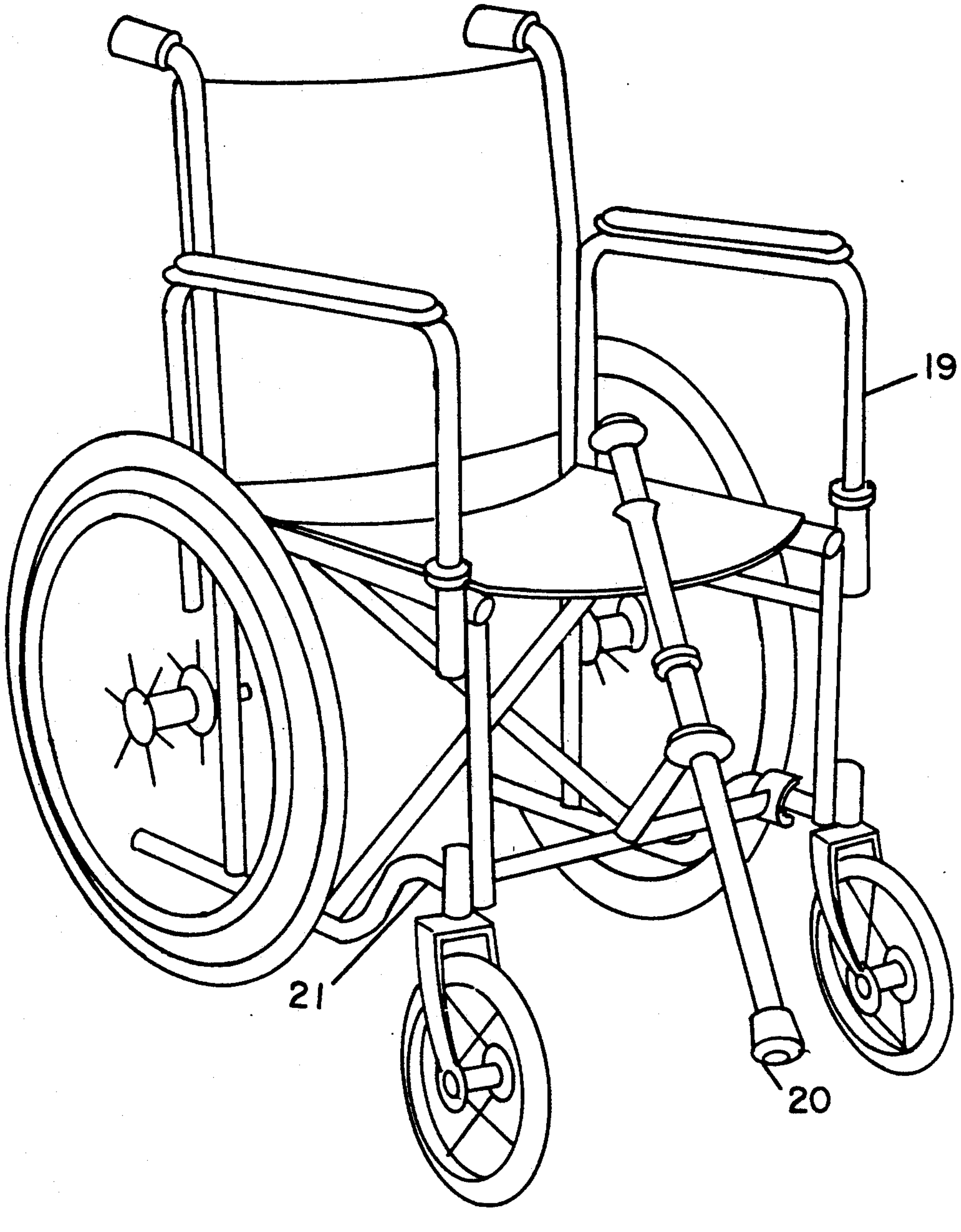
FIG. 3 shows a perspective view of applicant's device when attached to a wheelchair.

FIG. 3 shows the device 19 of applicant's invention on wheelchair 18. Set screws 5 (as shown in FIG. 1) secures the device 19 on the frame of wheelchair 18.

While this invention has been described with regard to specific and preferred embodiments it is comtemplated that various modifications are possible without departing from applicant's inventive concept.

I claim:

1. A device for operating a wheelchair with one arm comprising a first member engagedly attached to a frame of the wheelchair and a second member movably attached to the first member such that while the device is attached to the frame, the second member frictionally engages a surface across which the wheelchair is operated.

2. The device of claim 1, wherein the first member is a horizontal member which is engagedly attached to a vertical beam of the frame of the wheelchair.

3. The device of claim 1, wherein the first member is a horizontal member which is engagedly attached to a horizontal beam of the frame of the wheelchair.

4. The device of claim 1, wherein the first and second members telescope in length, wherein the second member has a knob on one end and a rubber tip on another end and wherein the second member is pivotally and slidably attached to the first member.

5. The device of claim 1, wherein the second member pivotally and frictionally engages the surface across which the wheelchair is operated.

6. The device of claim 1, wherein the second member is pivotally and slidably attached to the first member and wherein said second member pivotally and frictionally engages the surface across which the wheelchair is operated.

7. The device of claim 1, wherein the first member is elongated and adjustable in length.

8. The device of claim 1, which further comprises an urging means which urges the second member away from engagement with the surface across which the wheelchair is operated.

9. The device of claim 1, wherein the first member is tubing having on each end means for an attachable engagement with the frame of the wheelchair.

10. The device of claim 1, wherein the second member is a staff having a knob on one end and having on the other end a means for frictional engagement with the surface across which the wheelchair is operated.

11. The device of claim 1, wherein the second member is slidably and pivotally attached to the first member.

12. The device of claim 1, wherein the second member is attached to the first member by a third member which is fixedly attached to the first member and movably attached to the second member.

13. A device for operating a wheelchair with one arm comprising:

A. an elongated first member adjustable in length and having means on both ends for an engagedly attachment to a frame of the wheelchair;

B. an elongated second member having a knob on one end and a frictional means on another end;

wherein the second member is pivotally and slidably attached to the first member and wherein the second member frictionally engages the surface across which the wheelchair is operated.

14. The device of claim 13, wherein the first member is tubing adjustable in length and having on each end clamps for attachment of the front of the frame of the wheelchair.

15. The device of claim 13, wherein the second member is a staff adjustable in length and having a knob on one end and a pivotal friction foot on another end.

16. The device of claim 13, which further comprises an urging means which urges the second member away from engagement with the surface across which the wheelchair is operated.

17. A device for operating a wheelchair with one arm comprising:

A. an elongated first member comprising tubing adjustable in length and having on both ends means to be engagedly attached to a frame of the front of the wheelchair;

B. a second member comprising a staff having a knob on one end and a friction means on another end;

C. a third member comprising tubing; and

D. an urging member;

wherein the first member is attached to the second member by the third member, wherein the third member has one end fixedly attached to the first member and another end pivotally and slidably attached to the second member such that when the device is attached to the frame of the front of the wheelchair, the friction means of the second member is cabable of frictional engagement with the surface across which the wheelchair is operated by frictionally engaging the surface around the periphery of the front of wheelchair and wherein the urging means urges the second member away from the frictional engagement.

18. The device of claim 17, wherein U-joints and set screws disposed on each end of the first member are the means by which the first member can be engagedly attached to the frame of the wheelchair, wherein the friction means on one end of the second member is a ball and socket joint having a flat side clad with a rubber pad, wherein the urging member is a spring held in place by a collar and a set screw and wherein the third member is pivotally attached to the second member with a ball and socket joint.

* * * * *